(12) United States Patent
Ebner et al.

(10) Patent No.: US 10,009,488 B1
(45) Date of Patent: Jun. 26, 2018

(54) METHODS AND SYSTEMS FOR AUTOMATICALLY INITIATING PRINT DEVICE SERVICE REQUESTS USING PROACTIVE INCIDENT DETECTION AND ANALYSIS

(71) Applicant: Xerox Corporation, Norwalk, CT (US)

(72) Inventors: Fritz Francis Ebner, Pittsford, NY (US); John C. Handley, Fairport, NY (US); Bryan R. Dolan, Webster, NY (US); Daniel Stark, Webster, NY (US); Raviteja Gunda, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/455,602

(22) Filed: Mar. 10, 2017

(51) Int. Cl.
*G06F 3/12* (2006.01)
*H04N 1/00* (2006.01)

(52) U.S. Cl.
CPC ....... *H04N 1/00344* (2013.01); *G06F 3/1204* (2013.01); *G06F 3/1217* (2013.01); *G06F 3/1232* (2013.01); *G06F 3/1289* (2013.01); *H04N 1/00037* (2013.01); *H04N 1/00039* (2013.01); *H04N 1/00055* (2013.01); *H04N 1/00061* (2013.01); *H04N 1/00079* (2013.01); *H04N 1/00954* (2013.01); *H04N 2201/0081* (2013.01); *H04N 2201/0094* (2013.01)

(58) Field of Classification Search
CPC .... G06F 3/1218; G06F 3/1219; G06F 3/1232; G06F 3/1289; G06F 3/1293; H04N 1/00344; H04N 1/00037; H04N 1/00053; H04N 1/00061; H04N 1/00042; H04N 1/00055; H04N 1/00079; H04N 1/00954; H04N 2201/0008; H04N 2201/0001; H04N 2201/0094
See application file for complete search history.

(56) References Cited

U.S. PATENT DOCUMENTS

| 6,732,195 | B1 * | 5/2004 | Baldwin | G06F 3/121 710/18 |
|---|---|---|---|---|
| 8,473,249 | B2 | 6/2013 | Handley et al. | |
| 9,031,814 | B2 | 5/2015 | Handley | |
| 2009/0094091 | A1 * | 4/2009 | Thieret | G06Q 10/06 705/304 |
| 2009/0273801 | A1 * | 11/2009 | Steele | G06F 3/1205 358/1.15 |
| 2011/0004419 | A1 * | 1/2011 | Ue | G05B 23/0254 702/34 |
| 2012/0072769 | A1 * | 3/2012 | Goldszmidt | G06F 11/0793 714/15 |
| 2012/0209565 | A1 * | 8/2012 | Handley | G06F 3/121 702/179 |

(Continued)

*Primary Examiner* — Moustapha Diaby
(74) *Attorney, Agent, or Firm* — Fox Rothschild LLP

(57) ABSTRACT

A method of proactively identifying print device incidents for servicing by a service provider may include receiving print device data for one or more print devices, determining a probability value for each of the one or more of the print devices based on the print device data, where each probability value represents a likelihood that the print device will experience a subsequent incident of an incident type within a timeframe, identifying one or more of the print devices associated with probability values that each exceed a threshold value, and for one or more of the print devices that is identified, automatically initiating a service request for the subsequent incident.

21 Claims, 15 Drawing Sheets

(56) References Cited

U.S. PATENT DOCUMENTS

2013/0114100 A1\* 5/2013 Torii ................... G06F 11/0733
 358/1.14
2015/0381434 A1\* 12/2015 Tamvada ................ H04L 41/22
 715/736

\* cited by examiner

METHODS AND SYSTEMS FOR AUTOMATICALLY INITIATING PRINT DEVICE SERVICE REQUESTS USING PROACTIVE INCIDENT DETECTION AND ANALYSIS

BACKGROUND

Currently, it is difficult to determine with meaningful accuracy when a particular print device is going to need to be serviced. Servicing a print device after an incident occurs often results in downtime for the print device, which can result in delays and inefficiencies for device users, and an increased workload for other operable print devices.

The methods and systems described below involve using proactive measures to identify which print devices are likely to need servicing in the near future. To minimize operational downtime, the system described in this disclosure proactively creates service incidents for print devices whose likelihood of needing servicing exceeds a threshold value. As such, the downtime and inefficiencies associated with servicing a print device can be better addressed and handled through advance planning and implementation.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system of proactively identifying print device incidents for servicing by a service provider includes an electronic device and a computer-readable storage medium. The computer-readable storage medium includes one or more programming instructions that, when executed, cause the electronic device to perform one or more actions. The system receives print device data for one or more print devices. Optionally, the system may receive print device data from the one or more print devices.

The print device data includes, for one or more of the print devices an amount of time since an occurrence of a previous incident experienced by the print device, and a print volume processed by the print device since the occurrence of the previous incident. The previous incident is associated with an incident type. The system determines a probability value for each of the one or more of the print devices based on the print device data. Each probability value represents a likelihood that the print device will experience a subsequent incident of the incident type within a timeframe. Optionally, the system may apply a Kaplan-Meier estimator to the print device data.

The system identifies one or more of the print devices associated with probability values that each exceed a threshold value. Optionally, the system may receive an indication of the threshold value from a user. The threshold value may be a value above which the print device is likely to experience the subsequent incident. For one or more of the print devices that is identified, automatically initiates a service request for the subsequent incident. The service request may include a unique identifier associated with the print device and a description of the incident type.

The system may route the service request to a client electronic device associated with a service technician of the service provider. The system may route the service request to a system associated with a service provider for processing.

Optionally, the system may create a visualization of the probability values, and cause the visualization to be displayed at a client electronic device of a service technician. The visualization may include a comparison of the probability values for the print devices. The visualization may be color coded to indicate the probability value associated with the corresponding print device.

The system may identify from the one or more print devices, a print device associated with a highest probability value, and identify a location of a client electronic device within the environment. The system may determine a route from the location of the client electronic device to a location of the print device associated with the highest probability value, and cause a visual representation of the route to be displayed on the floorplan at the client electronic device.

The system may create a floorplan associated with the one or more print devices. The floorplan may illustrate an environment and includes one or more icons that represent locations of the one or more of the print devices within the environment.

BRIEF DESCRIPTION OF THE DRAWINGS

FIG. 3 illustrates example print device data that may be received from one or more print devices over a period of time according to an embodiment.

FIG. 12 illustrates an example visualization that may be created according to an embodiment.

DETAILED DESCRIPTION

Figure 1:
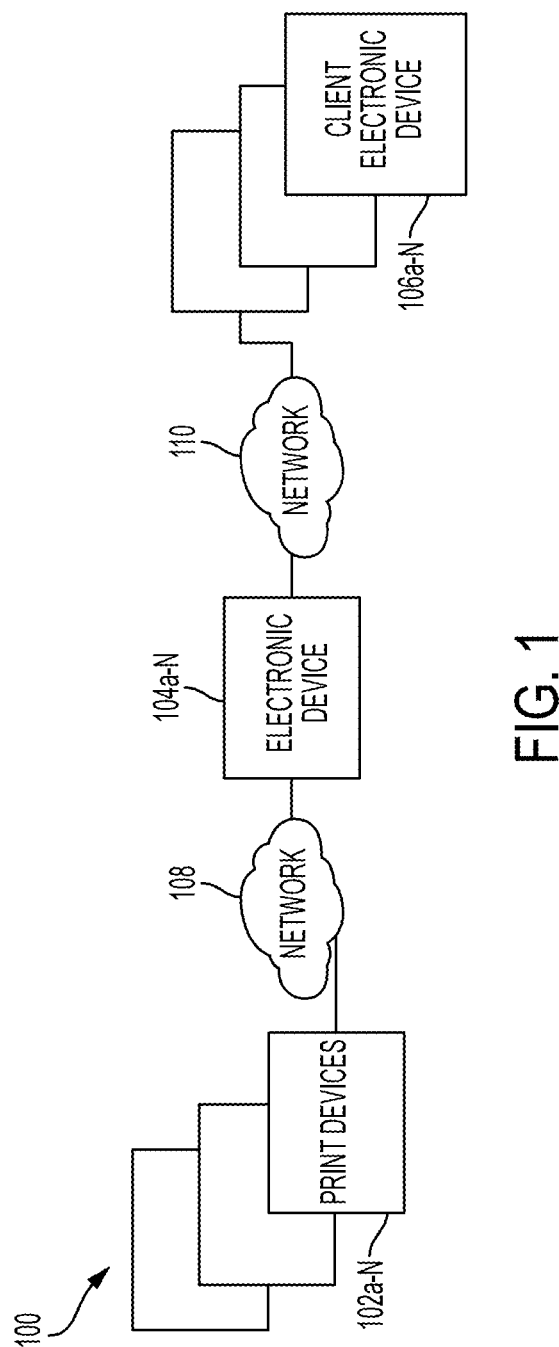
FIG. 1 shows an example system for proactively identifying print device incidents according to an embodiment.

The following terms shall have, for purposes of this application, the respective meanings set forth below:

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

An "incident" refers to an event that occurs on a print device. An incident may be error, malfunction, fault and/or the like experienced by a print device. For a print device, example incidents may include, without limitation, a paper jam, a device fault, a broken part, a software error, issues with output quality and/or the like.

A "print device" refers to a device capable of performing one or more functions, operations and/or services on a print job. For example, a print device may provide print-related services for one or more print jobs. A print device may include a printer, scanner, multi-function device or other similar equipment.

A "print job" refers to a logical unit of work that is to be completed. For example, a print job may be a request to print, collate, cut, staple and/or bind a document or set of documents.

A "print volume" refers to a measure of output produced by a print device over a period of time. The phrase "print volume" is construed broadly to include, without limitation, a number of physical pages, a number of impressions, a number of images printed on a continuous web, a number of sides on a printed package, a number of prints in "n-up" arrangements for book bindings and/or the like.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "service provider" refers to person or entity that provides print device maintenance services such as, for example, equipment installation, equipment inspection, equipment repair and/or replacement, onsite and standby coverage, supply and inventory management, technical training, and/or the like. A service provider may refer to a manufacturer or vendor of one or more print devices. For example, an entity that manufacturers or sells print devices may also service such print devices. Alternatively, a service provider may refer to a person or entity who is not the manufacturer or vendor of print devices. For instance, a service provider may be a third party that a print device owner or lessee contracts with to service the print device.

A "service request" refers to a report of or a request for support or service with respect to a print device. A service incident may be an electronic request such as, for example, an email or an electronic service request. A service request may be initiated to resolve an incident experienced by a print device.

A "service technician" refers to an individual who services one or more print devices on behalf of a service provider.

FIG. 1 shows an example system for proactively identifying print device incidents according to an embodiment. As illustrated by FIG. 1, a system 100 may include a plurality of print devices 102a-N, one or more electronic devices 104a-N, and one or more client electronic devices 106a-N. The electronic devices 104a-N may communicate with one or more of the print devices 102a-N and/or one or more of the client electronic devices 106a-N via one or more communication networks 108, 110. A communication network may be a local area network (LAN), a wide area network (WAN), a mobile or cellular communication network, an extranet, an intranet, the Internet and/or the like.

An electronic device 104a-N may receive and store print device data from one or more print devices 102a-N. The print device data may include performance data relating to operation of one or more print devices 102a-N. For instance, the print device data may include a unique identifier associated with a print device 102a-N, an indication of a model of the print device, a type of incident experienced by a print device, a date and/or time that such incident was experienced, a number of days between a previous incident and a current incident, a number of pages processed between a previous incident and a current incident, and/or the like.

An electronic device 104a-N may store print device data received from one or more print devices 102a-N in a data store 112 such as a database, a table, a list and/or the like. An electronic device 104a-N may process at least a portion of the received print device data to proactively identify which print devices are likely to experience imminent incidents, as described in more detail below.

An electronic device 104a-N may communicate with one or more client electronic devices 106a-N. A client electronic device 106a-N may be an electronic device used by an administrator or other user to monitor incidents and service requests for print devices. A client electronic device 106a-N may be mobile electronic device used by a service technician to respond to service requests or resolve incidents.

In various embodiments, the system 100 may be implemented as a cloud computing architecture. One or more of the electronic devices 104a-N may be located remotely from one or more of the print devices 102a-N and/or one or more of the client electronic devices. One or more electronic devices 104a-N may be implemented as one or more virtual machines.

In various embodiments, one or more electronic devices 104a-N may be located on-premises with one or more print devices 102a-N and/or one or more client electronic devices 104a-N.

Figure 2:
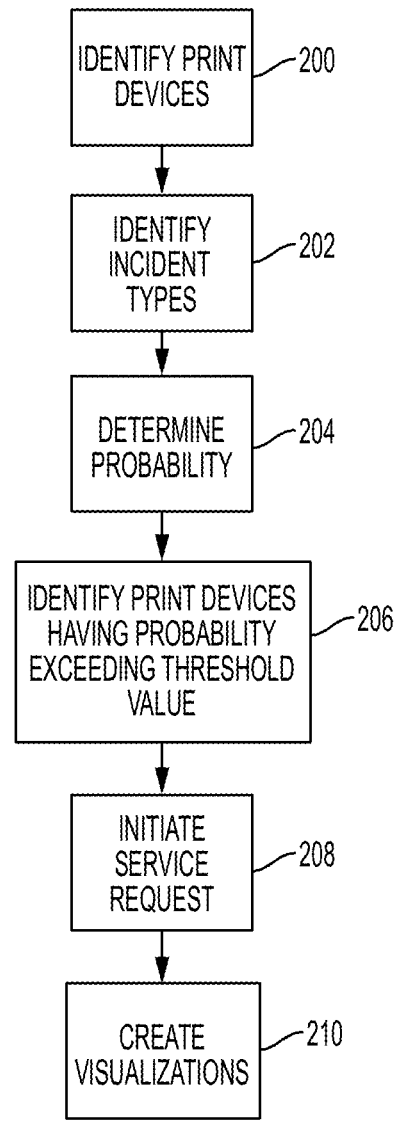
FIG. 2 illustrates an example method of proactively identifying print device incidents according to an embodiment.

FIG. 2 illustrates an example method of proactively identifying print device incidents according to an embodiment. As shown in FIG. 2, an electronic device may identify 200 one or more print devices to analyze. The identified print devices may be one or more print devices under the control of a particular operator. As another example, the identified print devices may be ones that are located at a particular location or within a particular geographic region. An administrator or other user may specify one or more parameters for identifying 200 the print devices that are to be analyzed. An electronic device may maintain or have access to a data store of information associated with print devices, and the electronic device may apply the one or more parameters to the data store to identify 200 print devices for analysis. Alternatively, an electronic device may query or ping one or more print devices to ascertain a location associated with the print devices.

For one or more of the identified print devices, an electronic device may identify 202 one or more incident types associated with the print device. An incident type refers to a category of incidents that may be experienced by a print device. For instance, example incident types associated with a printer may include paper jam, device fault and output quality, while incident types associated with a scanner may include platen faults, paper jam and output quality. Additional or alternate incident types may be used within the scope of this disclosure.

In various embodiments, an electronic device may identify 202 incident types for a print device by accessing a data store that stores this information. A data store may store incident types for a particular print device, or incident types for a print device type (e.g., printer, scanner, or multifunction device).

Alternatively, an electronic device may receive print device data from one or more print devices. The print device data may include information about a print device such as, for example, a unique identifier associated with the print device and a model identifier associated with the print device. The print device data may include performance data associated with a print device over a period of time. Performance data may include, without limitation, an incident type experienced by a print device, a date and/or time that an incident was experienced, a number of days between a current incident and a previous incident of the same incident type, a print volume processed by a print device between a previous incident of the same incident type and a current incident of the incident type. A print device may store one or more logs of print device data in a data store or other memory of the print device. A print device may send at least a portion of print device data to an electronic device. For instance, a print device may send at least a portion of print device data to an electronic device in response to receiving a request from an electronic device. As an example, a service technician may use a tablet to initiate communication with a print device, and may receive print data from the print device. Alternatively, a print device may send print device data to an electronic device periodically.

Figure 3:
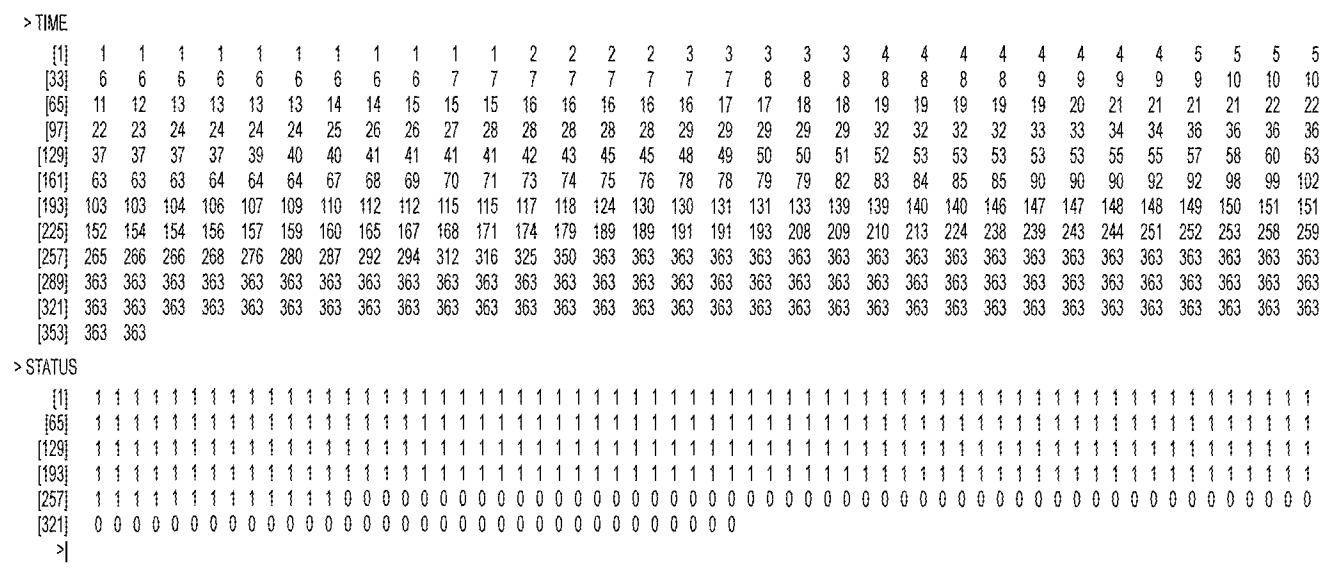

FIG. 3 illustrates example print device data that may be received from one or more print devices over a period of time according to an embodiment. An electronic device may store received print device data in a data store.

For a particular print device and incident type, an electronic device may determine 204 a probability that the print device will experience an incident of the identified incident type. The incident may be one that has not occurred yet, but may occur subsequent to the received print device data. A probability that a print device will experience an incident may be based on or be a function of at least a portion of print device data such as, for example, an amount of time since the print device experienced a previous incident of the incident type and a print volume processed by the print device since a previous incident of the incident type.

In various embodiments, an electronic device may utilize survival analysis in determining 204 a probability that a print device will experience an incident. Survival analysis refers to a methodology for analyzing data where the outcome is the time until the occurrence of an event of interest. For purposes of this disclosure, the event of interest is the occurrence of an incident at a print device. The specific question of interest is, given a set of print devices, each having some time and some print volume that has elapsed since a last incident, what is the likelihood that an incident will occur in a next time frame (e.g., within one week).

An electronic device may determine 204 a probability that a print device will experience an incident utilizing the Kaplan-Meier estimate of a survival function. A survival function is the probability that a device will survive beyond a specified time; that is, it is the probability no incident will occur beyond a specified time. It is expected to approach zero as the specified time increases. The Kaplan-Meier estimator is a non-parametric statistic used to estimate the survival function from data. The Kaplan-Meier estimate of the survival function may be represented by the following equations for value and variance:

$$\hat{S}(t) = \begin{cases} 1 & \text{if } t < t_1 \\ \prod_{t_i \leq t}\left[1 - \frac{d_i}{Y_i}\right] & \text{if } t_1 \leq t \end{cases}$$

$$\hat{V}[\hat{S}(t)] = [\hat{S}(t)]^2 \hat{\sigma}_S^2(t) = [\hat{S}(t)]^2 \sum_{t_i \leq t} \frac{d_i}{Y_i(Y_i - d_i)}$$

where $\hat{S}(t)$ is the survival function
$t_i$ is the time (duration) of an observed incident
$d_i$ is the number of incidents occurring at time $t_i$
$Y_i$ is the number of print devices that are at risk of experiencing an incident at time $t_i$ The survival function is identical to one minus the cumulative probability distribution of the underlying incidents. The confidence limits at alpha threshold (e.g. 5%), are found by:

$$\hat{S}(t) = \begin{cases} 1 & \text{if } t < t_1 \\ \prod_{t_i \leq t}\left[1 - \frac{d_i}{Y_i}\right] & \text{if } t_1 \leq t \end{cases}$$

$$\hat{V}[\hat{S}(t)] = [\hat{S}(t)]^2 \hat{\sigma}_S^2(t) = [\hat{S}(t)]^2 \sum_{t_i \leq t} \frac{d_i}{Y_i(Y_i - d_i)}$$

An electronic device may use the survival function to create one or more survival curves. For instance, an electronic device may create one survival curve as a function of time and another as a function of print volume. The survival curves may have a certain confidence limit such as, for example 95%.

Figure 4A:
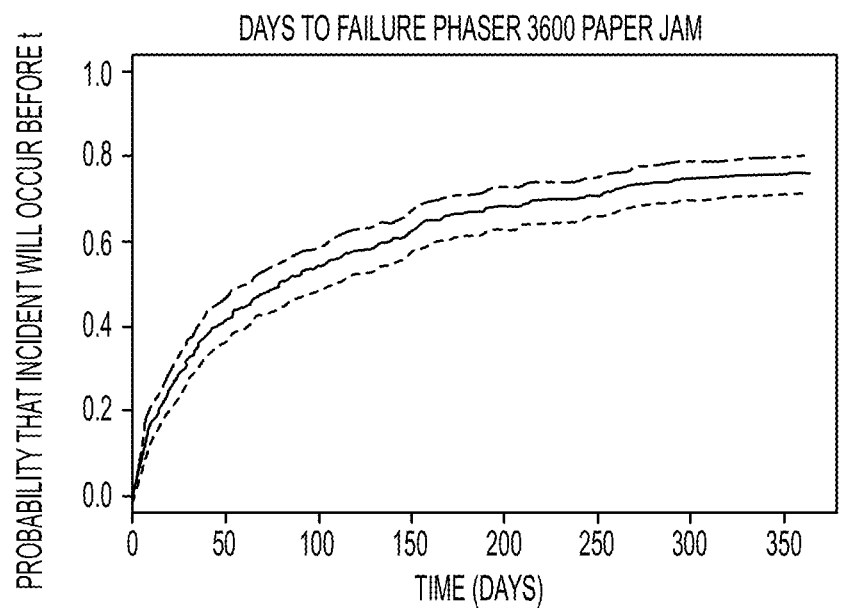
FIGS. 4A, 4B, 5A, 5B, 6A and 6B illustrate example survival curves according to various embodiments.
Figure 4B:
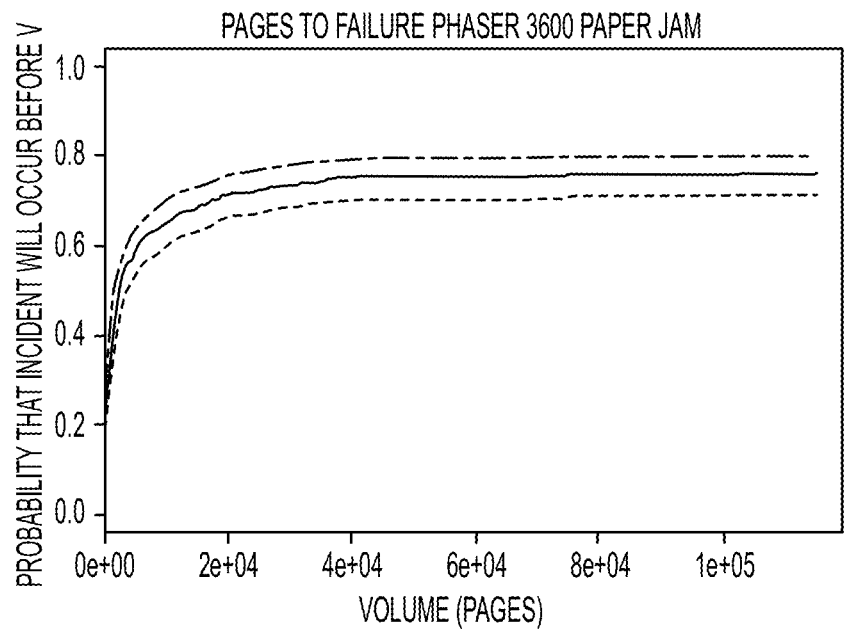
Figure 5A:
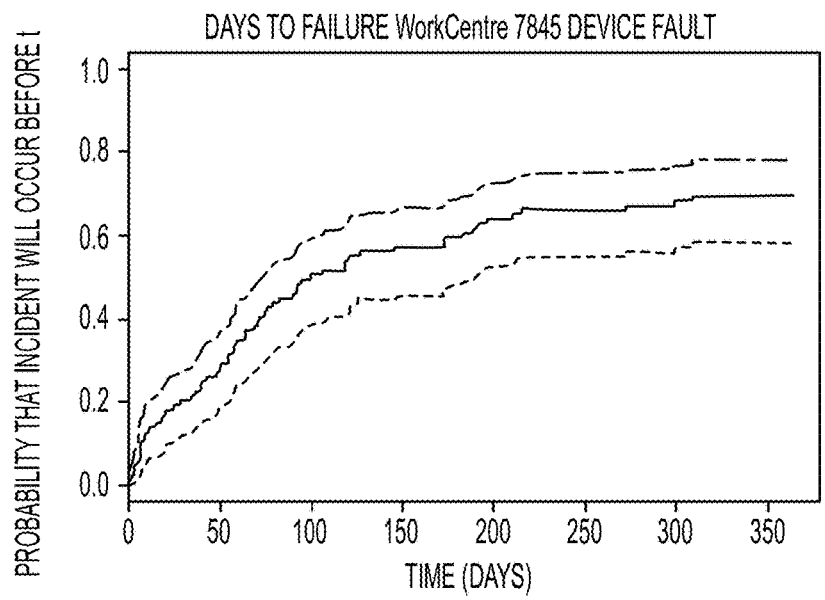
Figure 5B:
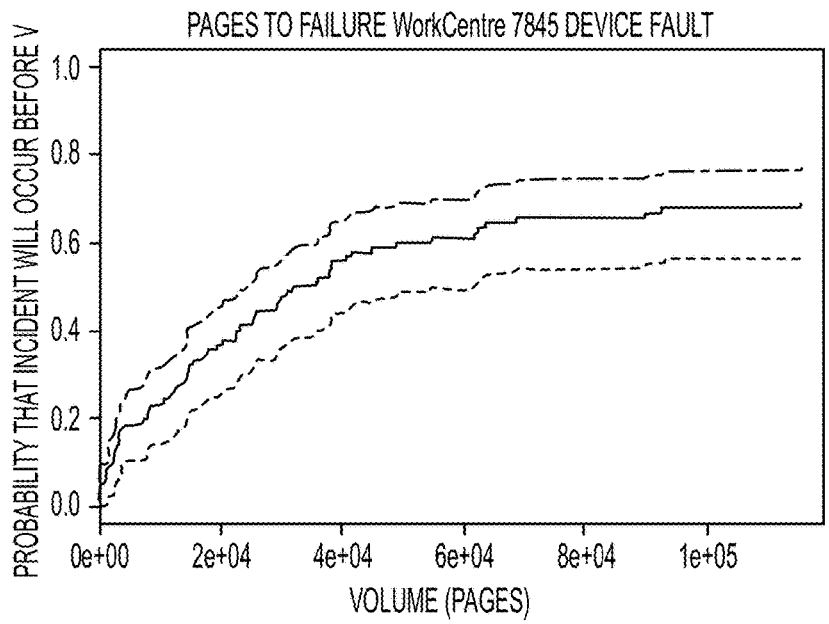
Figure 6A:
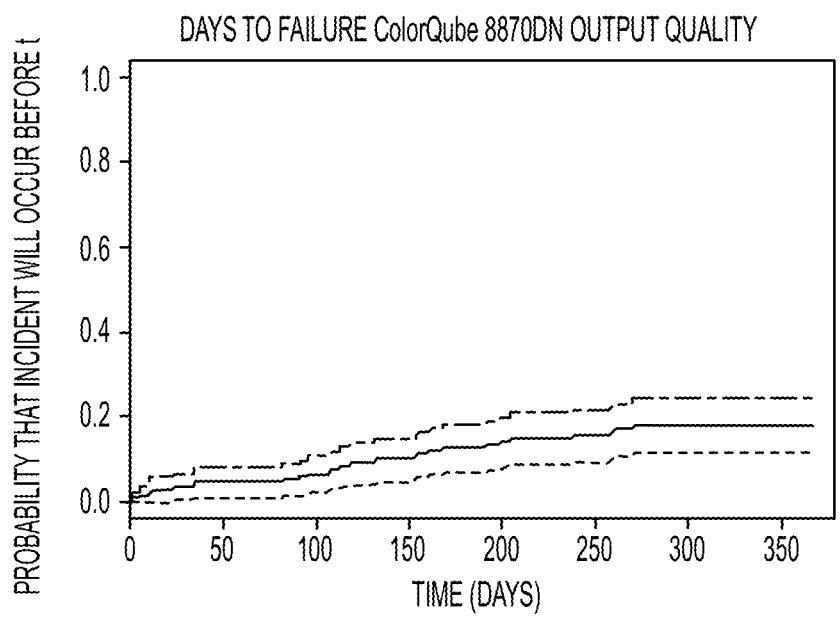
Figure 6B:
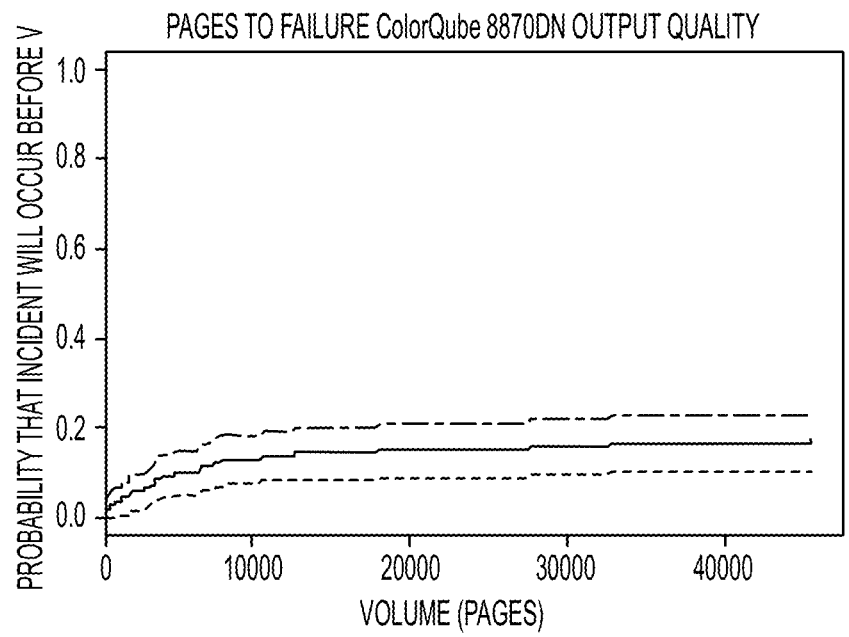

FIG. 4A illustrates an example survival curve for the print device model "Phaser 3600" with an incident type of "paper jam" that is created as a function of time. FIG. 4B illustrates an example survival curve for the print device model "Phaser 3600" with an incident type of "paper jam" that is created as a function of print volume. FIG. 5A illustrates an example survival curve for the print device model "WorkCentre 7845" with an incident type of "default fault" that is created as a function of time. FIG. 5B illustrates an example survival curve for the print device model "WorkCentre 7845" with an incident type of "default fault" that is created as a function of print volume. FIG. 6A illustrates an example survival curve for the print device model "ColorQube 8870DN" with an incident type of "output quality" that is created as a function of time. FIG. 6B illustrates an example survival curve for the print device model "ColorQube 8870DN" with an incident type of "output quality" that is created as a function of print volume.

Figure 7:
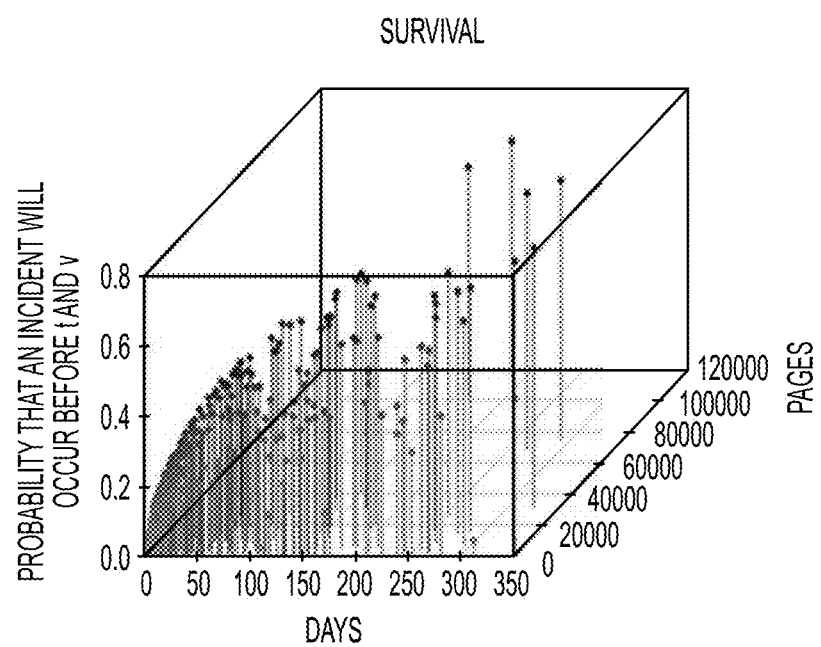
FIG. 7 illustrates an example surface visualization according to an embodiment.

An electronic device may extend one or more of the survival curves to two dimensions. A survival curve may be extended to two dimensions of independent variables (e.g., time and print volume). An electronic device may generate a surface visualization that plots the incident points as a function of both time and print volume. FIG. 7 illustrates an example surface visualization according to an embodiment.

Figure 8A:
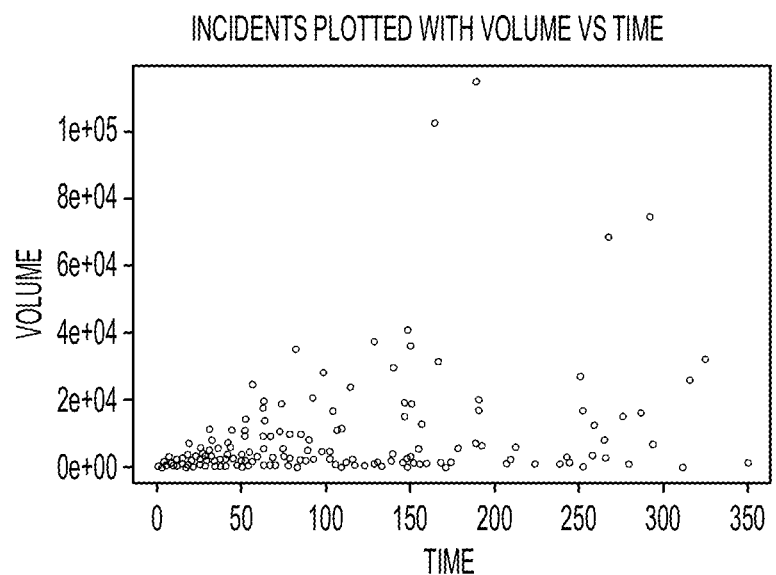
FIGS. 8A and 8B illustrate example data according to various embodiments.
Figure 8B:
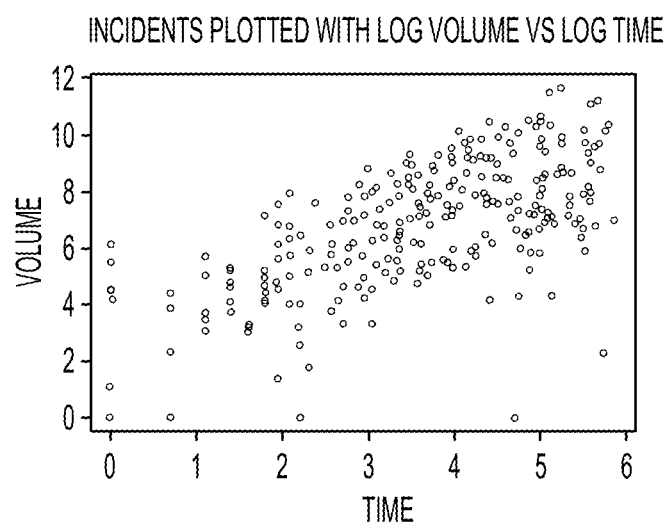

An electronic device may create a smooth continuous surface on two dimensions. Recognizing that a survival curve is identical to a cumulative distribution function of incident frequency distribution, an electronic device may create a three dimensional representation of the data and take the sum to convert it to the cumulative distribution. This step may be performed in log-log space. An electronic device may convert data into log-log space. FIG. 8A illustrates example data (Phaser 3600 model, paper jam incidents) plotted with volume vs. time, while FIG. 8B illustrates example data (Phaser 3600 model, paper jam incidents) plotted with log volume vs. log time. As illustrated by FIGS. 8A and 8B, the dispersion in log-log space is more evenly distributed.

Figure 9A:
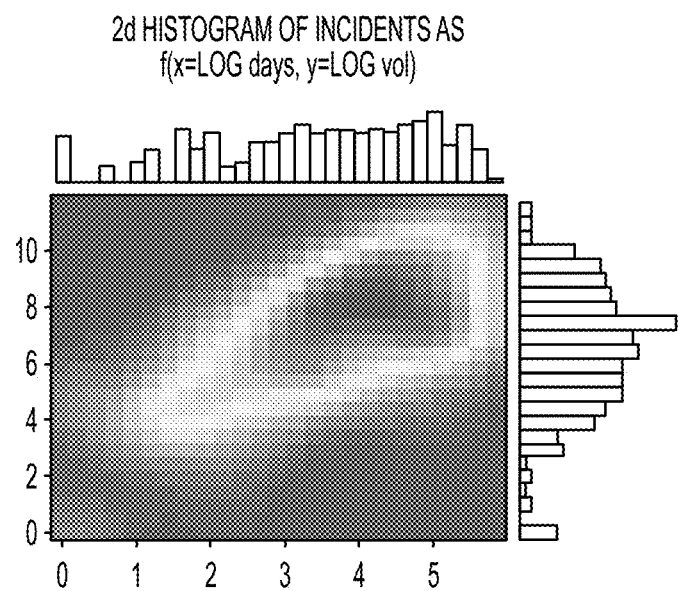
FIGS. 9A and 9B illustrate example two-dimensional histograms according to various embodiments.
Figure 9B:
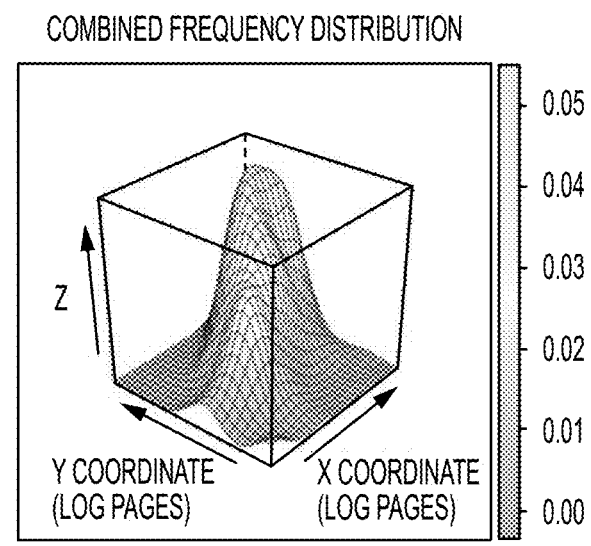

An electronic device may create a two-dimensional histogram from the converted data. FIG. 9A and FIG. 9B illustrate example two-dimensional histograms associated with the converted data illustrated in FIG. 8B according to various embodiments. FIG. 9A illustrates a heat map view, while FIG. 9B illustrates a wireframe view.

Figure 10:
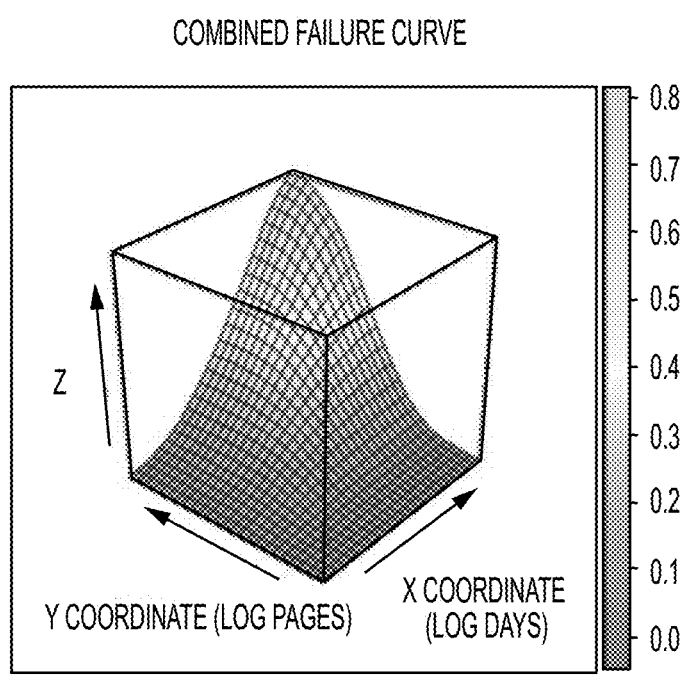
FIG. 10 illustrates an example cumulative distribution function shown as a three-dimensional wireframe according to an embodiment.
Figure 11:
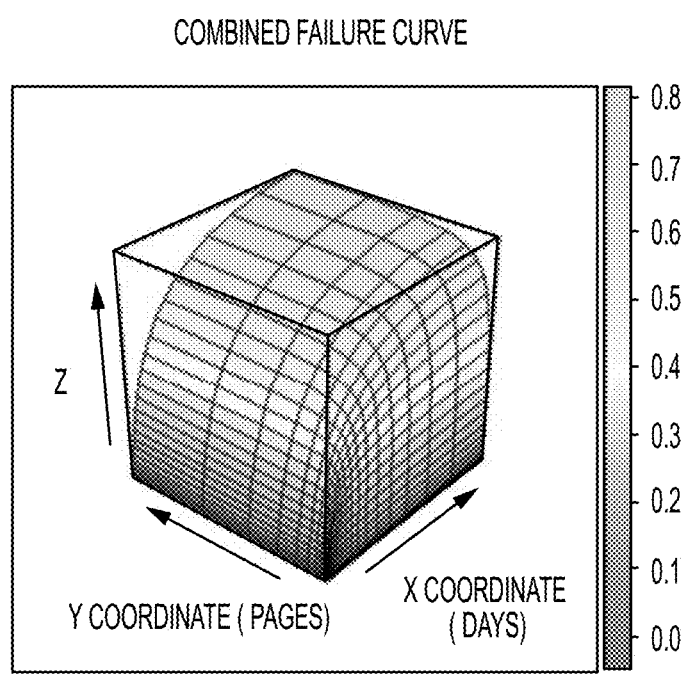
FIG. 11 illustrates a visualization in lin-lin space according to an embodiment.

An electronic device may convert the two-dimensional histogram to a cumulative distribution function by summing. FIG. 10 illustrates an example cumulative distribution function shown as a three-dimensional wireframe. An electronic device may take the inverse log of the axes to visualize in lin-lin space as illustrated in FIG. 11.

Although this disclosure discusses utilizing survival analysis in determining 204 a probability that a print device will experience an incident, additional and/or alternate predictive analysis techniques may be used within the scope of this disclosure. For example, a generalized boosted regression algorithm may be used within the scope of this disclosure.

An electronic device may determine 204 a probability that a print device will experience an incident of a particular incident type for multiple different print devices across multiple different incident types. For instance, an electronic device may determine 204 probabilities that the print devices located at a certain location will experience different incident types over a certain timeframe or during a time period.

Referring back to FIG. 2, an electronic device may identify 206 one or more print devices having a probability that exceeds a threshold value. The threshold value may be specified by a user or administrator, and may be configurable. In various embodiments, a threshold value may be a value above which is indicative of an imminent incident. For instance, a threshold value may be set at 0.85, indicating that print devices having probability values above 0.85 are likely to experience an incident of the corresponding incident type imminently. Imminence may be a parameter that a user or administrator can specify or configure, and the value may different across print devices, incident types and/or the like. For instance, imminence for a particular incident type may be one week, meaning that there is a high probability that a print device having a probability value that exceeds a threshold value is going to experience the corresponding incident type within the next week. Additional and/or alternate imminence values may be used within the scope of this disclosure.

An electronic device may automatically initiate 208 a service request for one or more print devices that are identified as having a probability that exceeds a threshold value. As such, a service technician may resolve issues before they become known to print device user. A service request may be directed to a service provider responsible for providing service for the applicable print device(s). A service request may be an electronic-based request for service for a particular print device. The service request may be an electronic form, an email and/or the like. An electronic device may initiate 208 a service request by populating one or more fields of the request. Example fields might include, without limitations, an identifier associated with the print device and an indication of the nature of the request or a description of the issue. For instance, an electronic device may create a service request that includes a unique identifier associated with a print device and a description of the incident type. In certain embodiments, the service request may include an indication that the request was automatically initiated to inform a service technician that an incident has not yet been experienced by a print device.

In various embodiments, an electronic device may be associated with a service provider. In this case, an electronic device may submit or route the service request to a service technician for handling. For instance, an electronic device may send the service request, or information about the service request, to a client electronic device associated with a service technician. The service request may be added to a queue or list of service requests for which the service technician is responsible, and this queue or list may be presented to the service technician at technician's client electronic device.

In other embodiments, an electronic device may be associated with a person or entity that is not a service provider. In this situation, an electronic device may submit or route the service request to a service provider system for processing. The service provider system may then route the service request to a service technician for handling such as, for example, in the manner described above.

An electronic device may create 210 one or more visualizations. The electronic device may present one or more visualizations via a graphical user interface. The electronic device may present one or more determined probabilities via one or more client electronic devices. For instance, an electronic device may cause one or more visualizations to be presented to a service technician via a client electronic device such as, for example, a tablet.

An electronic device may create 210 a visualization that includes information about one or more print devices. For instance, an electronic device may create 210 a visualization that includes, for one or more print devices, an indication of a print device, such as a unique identifier associated with the print device. A presentation may also include an indication of an incident type, an indication of a probability that the print device will experience the incident type over a certain time period. In certain embodiments, a visualization may also include a comparison of the probabilities in a manner so that it is easy to discern how the probability compares in value to other probabilities such as, for example, as a histogram.

Figure 12:
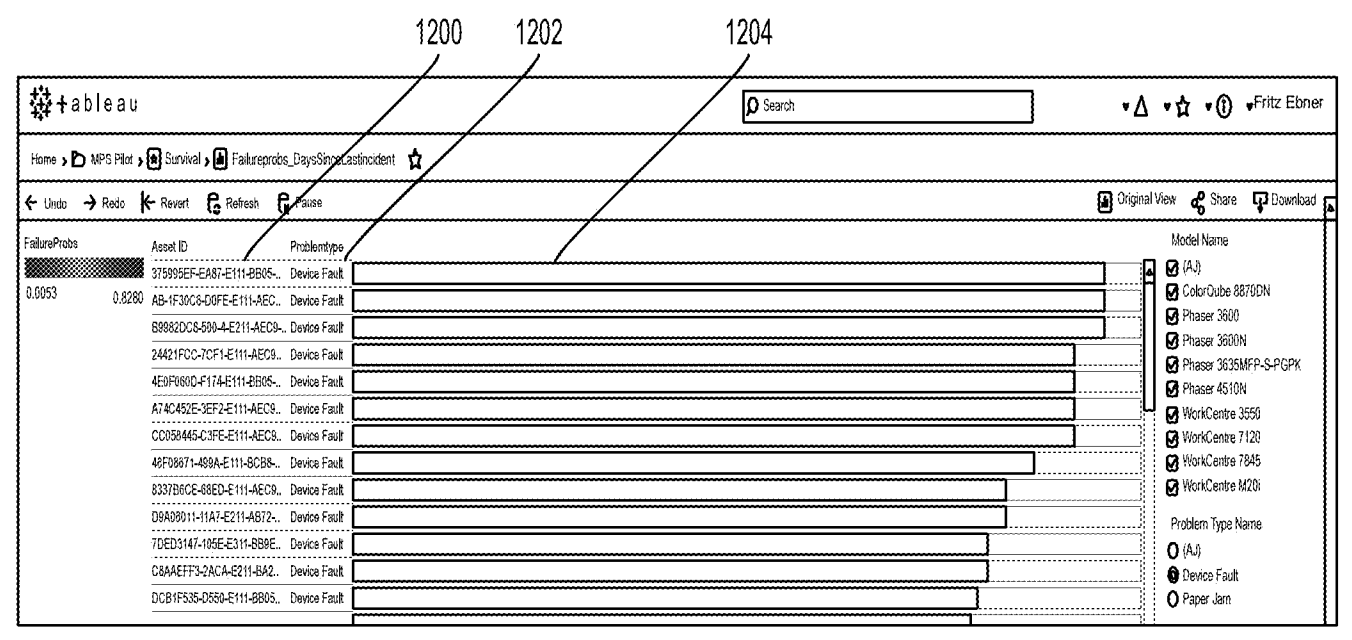

FIG. 12 illustrates an example visualization that may be created according to an embodiment. As illustrated by FIG. 12, the visualization shows unique identifiers 1200 for print devices, an indication 1202 of the incident type, and an indication 1204 of the determined probabilities for each print device and incident type combination. The print devices illustrated in FIG. 12 have been grouped by incident type, and as illustrated by FIG. 12, the print devices are presented in order from highest probability to lowest probability. But it is understood that alternative groupings may be used within the scope of this disclosure such as, for example, a grouping by site location.

As part of a visualization, an electronic device may create 210 a floorplan showing the location(s) of one or more print devices. A visualization may include a link to a floorplan. A link may be a hyperlink such that a user, such as a service technician, can access a floorplan by selecting the hyperlink. Alternatively, a floorplan may be embedded into a visualization, and presented to a user when the user performs an action, such as, for example, positioning an input indicator, such as a mouse cursor, over a representation of a print device.

Figure 13:
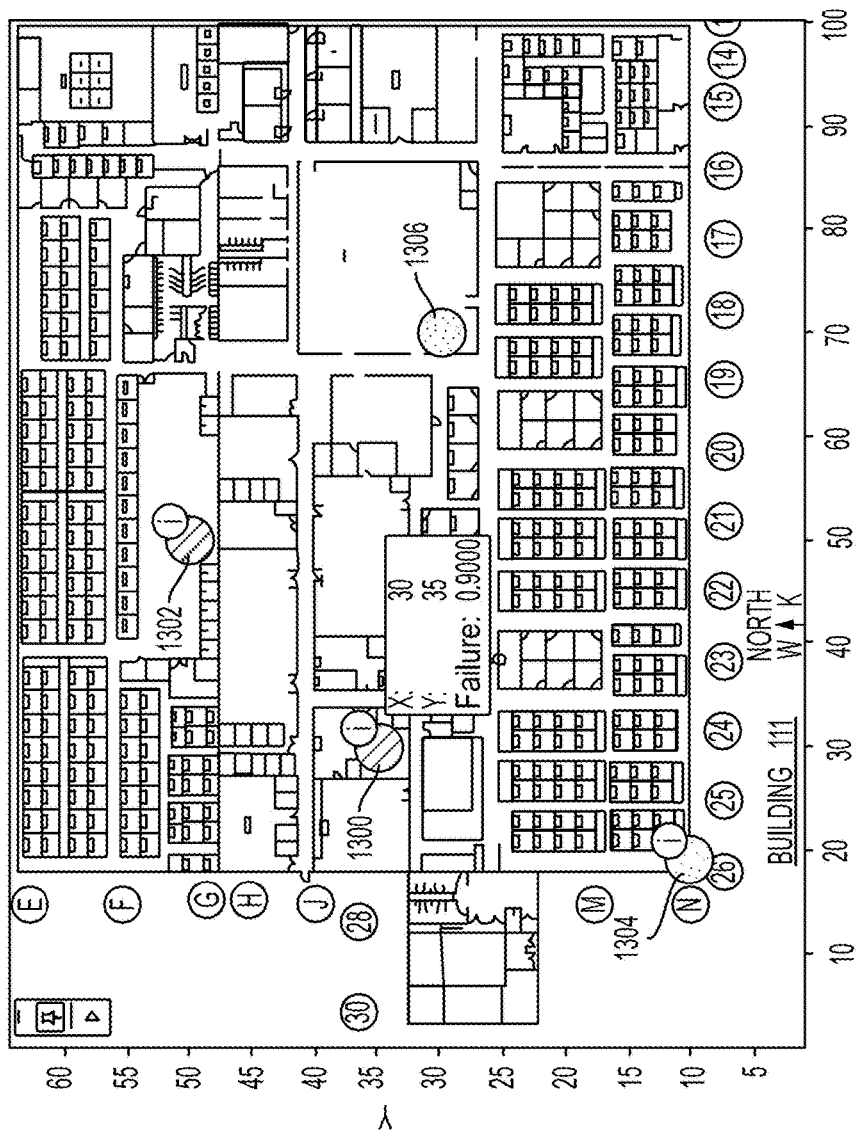
FIG. 13 illustrates an example floorplan according to an embodiment.

The floorplan may be a diagram showing the location of one or more print devices in an environment. A floorplan may be of a particular floor or building. A floorplan may show the location of one or more points of interest such as, for example, offices, rooms, stairs, elevators and/or the like. FIG. 13 illustrates an example floorplan according to an embodiment.

To create a floorplan, an electronic device may access a data store that stores one or more floorplans for one or more print devices. The data store may include position information for one or more print devices located in the environment depicted by the floorplan. Position information may include coordinates, a room number, or another indication of location. An electronic device may cause a visual representation of one or more print devices on the floorplan based on the position information. The visual representation may be an icon, a picture, an image and/or the like. The visual representation is positioned on the floorplan at a position where the associated print device is located.

For example, referring to FIG. 13, print devices are represented on the floorplan by circles 1300, 1302, 1304, 1306. An electronic device may cause a visual representation of a print device to be displayed in a manner that reflects the probability value associated with the print device. For instance, the visual representation of print devices may be color coded or shaded based on the associated probability value. As, an example, print devices associated with probability values in one range may be shown as green, print devices associated with probability values in a second range may be shown as yellow, and print devices associated with probability values in a third range may be shown as red. Alternatively, different shadings may be displayed as shown in FIG. 13.

By creating a floorplan that includes visual representations of print devices that illustrate the underlying probability values, a service technician can easily assess a priority for servicing print devices. In certain embodiments, a visual representation may also display additional details about an incident corresponding to a print device. For example, the visual representations of the print devices in FIG. 13 include an "i" icon. By selecting the icon or positioning an input indicator in vicinity of the icon, details about the incident corresponding to the print device. For instance, the details may include the incident type, a time associated with when the incident was reported and/or the like.

In various embodiments, an electronic device may display a route on a floorplan from a service technician's current location and a print device illustrated on the floorplan. For instance, an electronic device may display a route on a floorplan from a service technician's current location and a print device having a highest probability value, and therefore a highest service priority. An electronic device may receive information indicating a service technician's current location from a client electronic device associated with the service technician. This information may be obtained by a location sensor of a service technician's client electronic device. A location sensor may be, as an example, a global positioning system (GPS) receiver, a near-field communication or other beacon, such as a Bluetooth beacon, and/or the like.

An electronic device may utilize an indoor positioning system (IPS) to determine the location of a client electronic device and provide directions to a specific print device. An IPS refers to a system used to locate objects inside a building or other environment. An IPS may use radio waves, magnetic fields, acoustic signals or other information collected by one or more electronic devices, such as, for example, one or more client electronic devices, to ascertain a location of a client electronic device in an indoor environment. The information may be collected by one or more internal sensors of a client electronic device. An electronic device may process the collected information to ascertain location data associated with the client electronic device such as, for instance, coordinates, a latitude, a longitude, a floor number and/or the like. An electronic device may analyze the location data in the context of information associated with a floorplan of the environment, such as, for example, location data associated with points of interest of the floorplan. The electronic device can then determine a route between a current location of a client electronic device and a point of interest, such as, for instance, a particular print device.

Figure 14:
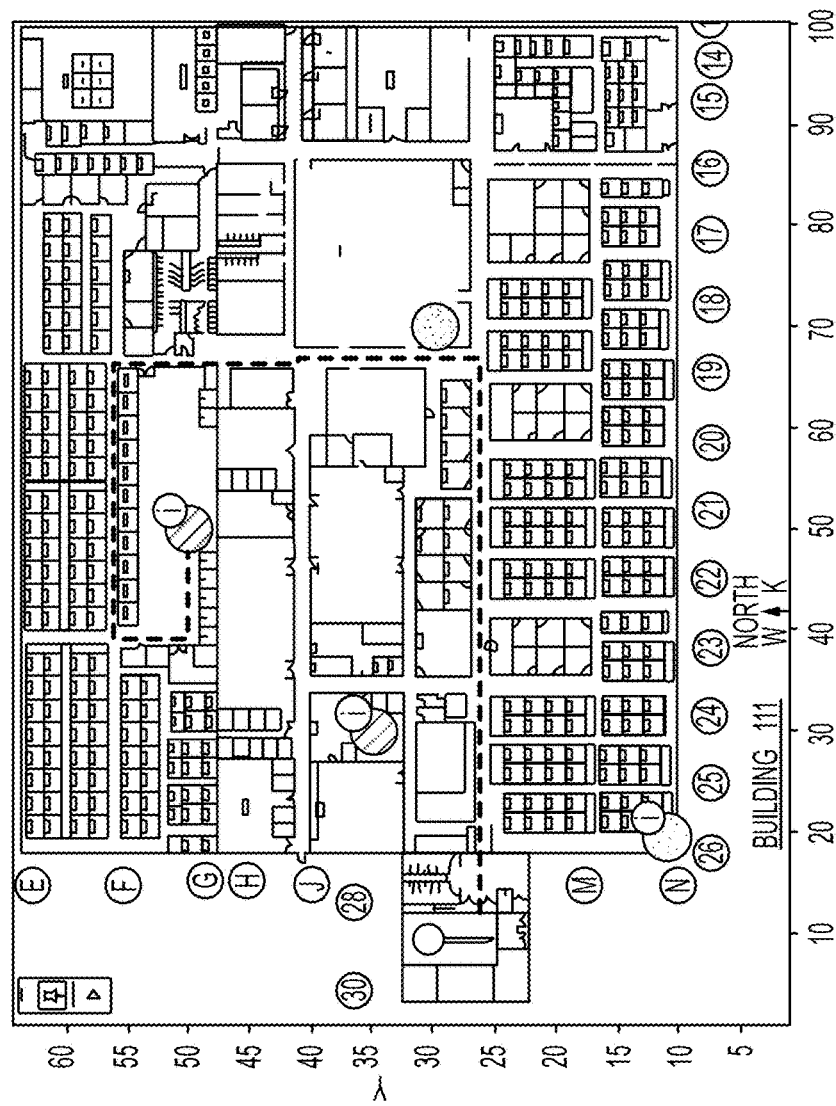
FIG. 14 illustrates example directions that are displayed visually as a highlighted route through the floorplan according to an embodiment.

As another example, an electronic device may utilize proximity solutions to determine the location of a client electronic device and provide directions to a specific print device. For example, an environment to which a floorplan corresponds may include near-field communication transmitters, such as Bluetooth transmitters, that may communicate with a client electronic device, such as a service technician's tablet, when the client electronic device is within range. The near-field communication transmitters may relay the position of a client electronic device to an electronic device, and an electronic device may cause directions, such as turn-by-turn directions, to be displayed to a service technician via the technician's client electronic device. The directions may be displayed as text or visually as part of the displayed floorplan. FIG. 14 illustrates example directions that are displayed visually as a highlighted route through the floorplan according to an embodiment.

When this document and any claim uses the term "processor," then unless specifically stated otherwise it is intended to refer to all such embodiments (i.e., single processor or multiple processors). When this document or any claim in the document uses the term "computer-readable memory," "computer-readable medium," or similar phrases, unless specifically stated otherwise it is intended to refer to an embodiment that include a single device, embodiments in which data is distributed across multiple devices, and embodiments relating to various sectors of a single device. Read only memory (ROM) and random access memory (RAM) constitute examples of non-transitory computer-readable storage media.

Figure 15:
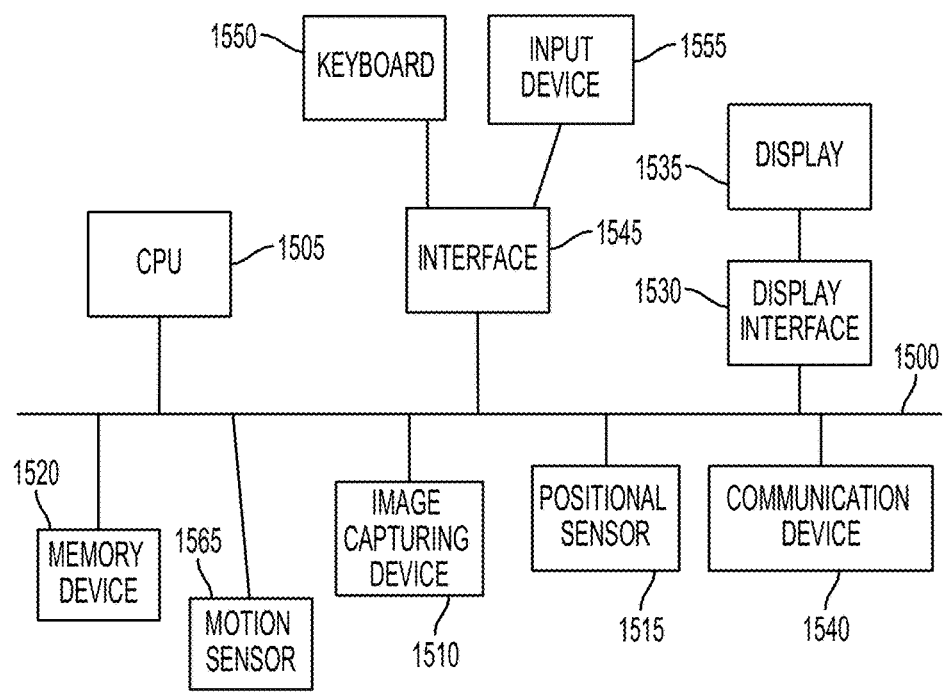
FIG. 15 illustrates a block diagram of example hardware that may be used to contain or implement program instructions according to an embodiment.

FIG. 15 depicts a block diagram of hardware that may be used to contain or implement program instructions, such as those of a cloud-based server, electronic device, virtual machine, or container. A bus 1500 serves as an information highway interconnecting the other illustrated components of the hardware. The bus may be a physical connection between elements of the system, or a wired or wireless communication system via which various elements of the system share data. Processor 1505 is a processing device that performs calculations and logic operations required to execute a program. Processor 1505, alone or in conjunction with one or more of the other elements disclosed in FIG. 15, is an example of a processing device, computing device or processor as such terms are used within this disclosure. The processing device may be a physical processing device, a virtual device contained within another processing device, or a container included within a processing device.

A memory device 1520 is a hardware element or segment of a hardware element on which programming instructions, data, or both may be stored. Read only memory (ROM) and random access memory (RAM) constitute examples of memory devices, along with cloud storage services.

An optional display interface 1530 may permit information to be displayed on the display 1535 in audio, visual, graphic or alphanumeric format. Communication with external devices, such as a printing device, may occur using various communication devices 1540, such as a communication port or antenna. A communication device 1540 may be communicatively connected to a communication network, such as the Internet or an intranet.

The hardware may also include a user input interface 1545 which allows for receipt of data from input devices such as a keyboard or keypad 1550, or other input device 1555 such as a mouse, a touch pad, a touch screen, a remote control, a pointing device, a video input device and/or a microphone. Data also may be received from an image capturing device 1510 such as a digital camera or video camera. A positional sensor 1515 and/or motion sensor 1565 may be included to detect position and movement of the device. Examples of motion sensors 1565 include gyroscopes or accelerometers. An example of a positional sensor 1515 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of proactively identifying print device incidents for servicing by a service provider, the method comprising:
   receiving, by an electronic device, print device data for one or more print devices, wherein the print device data comprises, for one or more of the print devices:
   an amount of time since an occurrence of a previous incident experienced by the print device, wherein the previous incident is associated with an incident type, and
   a print volume processed by the print device since the occurrence of the previous incident,
   determining, by the electronic device, a probability value for each of the one or more of the print devices based on the print device data utilizing a Kaplan-Meier estimate of a survival function, wherein each probability value represents a likelihood that the print device will experience a subsequent incident of the incident type within a timeframe, wherein the survival function is represented by:

$$\hat{S}(t) = \begin{cases} 1 & \text{if } t < t_1 \\ \prod_{t_i \leq t}\left[1 - \dfrac{d_i}{Y_i}\right] & \text{if } t_1 \leq t \end{cases}$$

where $t_i$ is a duration of an observed incident of the incident type,
$d_i$ is a number of incidents of the incident type occurring at time $t_i$
$Y_i$ is a number of print devices that are at risk of experiencing an incident of the incident type at time $t_i$;
identifying, by the electronic device, one or more of the print devices associated with probability values that each exceed a threshold value; and
for one or more of the print devices that is identified, automatically initiating a service request for the subsequent incident.

2. The method of claim 1, wherein receiving print device data for one or more print devices comprises, receiving, by the electronic device, print device data from the one or more print devices.

3. The method of claim 1, wherein identifying one or more of the print devices associated with probability values that exceed the threshold value comprises receiving an indication of the threshold value from a user, wherein the threshold value is a value above which the print device is likely to experience the subsequent incident.

4. The method of claim 1, wherein automatically initiating the service request for the subsequent incident comprises automatically initiating the service request that includes a unique identifier associated with the print device and a description of the incident type.

5. The method of claim 1, further comprising routing the service request to a client electronic device associated with a service technician of the service provider.

6. The method of claim 1, further comprising routing the service request to a system associated with a service provider for processing.

7. The method of claim 1, further comprising:
   creating a visualization of the probability values; and
   causing the visualization to be displayed at a client electronic device of a service technician.

8. The method of claim 7, wherein the visualization comprises a comparison of the probability values for the print devices.

9. The method of claim 7, wherein the visualization is color coded to indicate the probability value associated with the corresponding print device.

10. The method of claim 7, further comprising:
    identifying from the one or more print devices, a print device associated with a highest probability value;
    identifying a location of a client electronic device within an environment;

determining a route from the location of the client electronic device to a location of the print device associated with the highest probability value; and causing a visual representation of the route to be displayed on a floorplan at the client electronic device.

11. The method of claim 1, further comprising:

creating a floorplan associated with the one or more print devices, wherein the floorplan illustrates an environment and includes one or more icons that represent locations of the one or more of the print devices within the environment.

12. The method of claim 1, wherein a variance associated with the survival function is represented by:

$$\hat{V}[\hat{S}(t)] = [\hat{S}(t)]^2 \hat{\sigma}_S^2(t) = [\hat{S}(t)]^2 \sum_{t_i \leq t} \frac{d_i}{Y_i(Y_i - d_i)}$$

13. A system of proactively identifying print device incidents for servicing by a service provider, the system comprising:

an electronic device;

a computer-readable storage medium comprising one or more programming instructions that, when executed, cause the electronic device to:

receive print device data for one or more print devices, wherein the print device data comprises, for one or more of the print devices:

an amount of time since an occurrence of a previous incident experienced by the print device, wherein the previous incident is associated with an incident type, and a print volume processed by the print device since the occurrence of the previous incident, determine a probability value for each of the one or more of the print devices based on the print device data utilizing a Kaplan-Meier estimate of a survival function, wherein each probability value represents a likelihood that the print device will experience a subsequent incident of the incident type within a timeframe, wherein the survival function is represented by:

$$\hat{S}(t) = \begin{cases} 1 & \text{if } t < t_1 \\ \prod_{t_i \leq t} \left[1 - \frac{d_i}{Y_i}\right] & \text{if } t_1 \leq t \end{cases}$$

where $t_i$ is a duration of an observed incident of the incident type, $d_i$ is a number of incidents of the incident type occurring at time $t_i$, $Y_i$ is a number of print devices that are at risk of experiencing an incident of the incident type at time $t_i$;

identify one or more of the print devices associated with probability values that each exceed a threshold value, and for one or more of the print devices that is identified, automatically initiate a service request for the subsequent incident.

14. The system of claim 13, wherein the one or more programming instructions that, when executed, cause the electronic device to receive print device data for one or more print devices comprise one or more programming instructions that, when executed, cause the electronic device to receive print device data from the one or more print devices.

15. The system of claim 13, wherein the one or more programming instructions that, when executed, cause the electronic device to identify one or more of the print devices associated with probability values that exceed the threshold value comprise one or more programming instructions that, when executed, cause the electronic device to receive an indication of the threshold value from a user, wherein the threshold value is a value above which the print device is likely to experience the subsequent incident.

16. The system of claim 13, wherein the one or more programming instructions that, when executed, cause the electronic device to automatically initiate the service request for the subsequent incident comprise one or more programming instructions that, when executed, cause the electronic device to automatically initiate the service request that includes a unique identifier associated with the print device and a description of the incident type.

17. The system of claim 13, wherein the computer-readable storage medium further comprises one or more programming instructions that, when executed, cause the electronic device to route the service request to a client electronic device associated with a service technician of the service provider.

18. The system of claim 13, wherein the computer-readable storage medium further comprises one or more programming instructions that, when executed, cause the electronic device to route the service request to a system associated with a service provider for processing.

19. The system of claim 13, wherein the computer-readable storage medium further comprises one or more programming instructions that, when executed, cause the electronic device to:

create a visualization of the probability values; and cause the visualization to be displayed at a client electronic device of a service technician.

20. The system of claim 19, wherein the computer-readable storage medium further comprises one or more programming instructions that, when executed, cause the electronic device to:

identify from the one or more print devices, a print device associated with a highest probability value;

identify a location of a client electronic device within an environment;

determine a route from the location of the client electronic device to a location of the print device associated with the highest probability value; and cause a visual representation of the route to be displayed on a floorplan at the client electronic device.

21. The system of claim 13, wherein the computer-readable storage medium further comprises one or more programming instructions that, when executed, causes the electronic device to:

create a floorplan associated with the one or more print devices, wherein the floorplan illustrates an environment and includes one or more icons that represent locations of the one or more of the print devices within the environment.

* * * * *